Jan. 10, 1928.

W. S. PECK 1,655,797

CONVERTIBLE AUTOMOBILE TONNEAU

Filed March 3, 1926　　3 Sheets-Sheet 1

Inventor
W. S. Peck.
By
Lacey & Lacey, Attorneys

Jan. 10, 1928.
W S. PECK
1,655,797
CONVERTIBLE AUTOMOBILE TONNEAU
Filed March 3, 1926
3 Sheets-Sheet 2
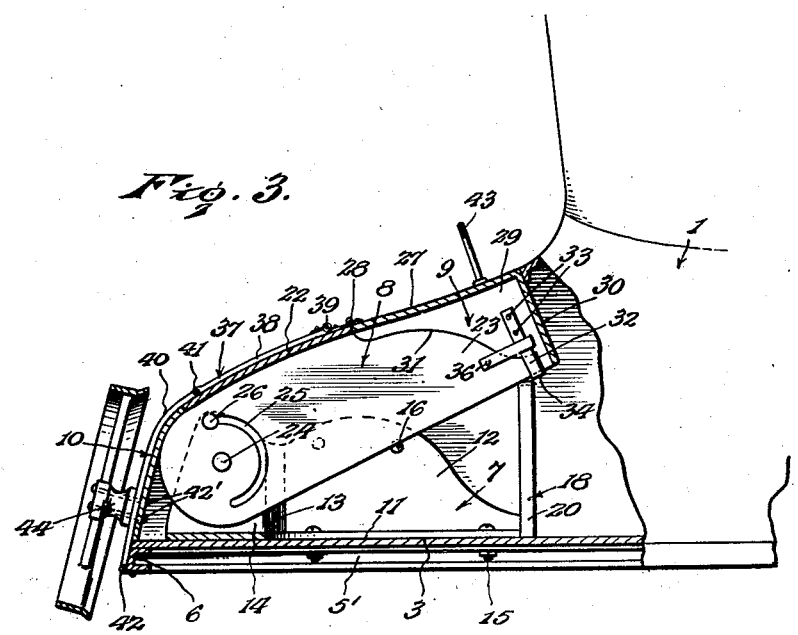
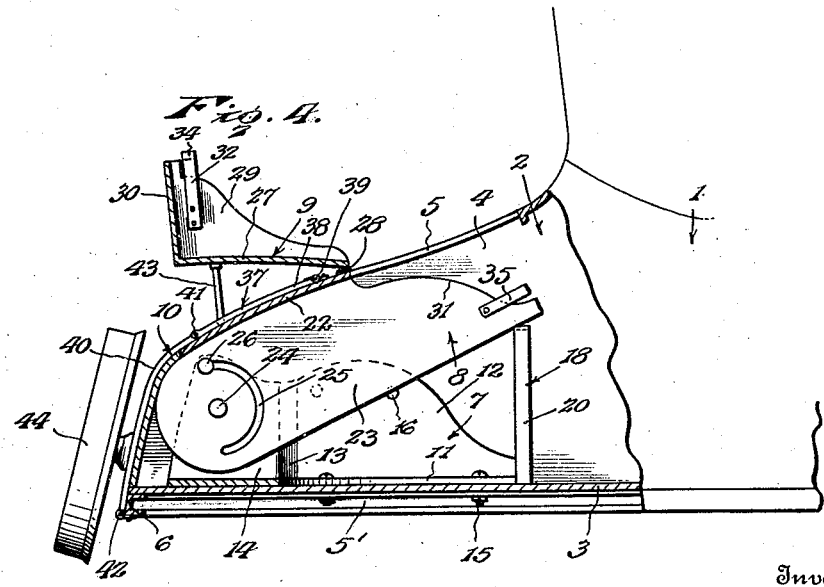
Inventor
W. S. Peck.
By
Attorney Jan. 10, 1928.
W. S. PECK
1,655,797
CONVERTIBLE AUTOMOBILE TONNEAU
Filed March 3, 1926   3 Sheets-Sheet 3
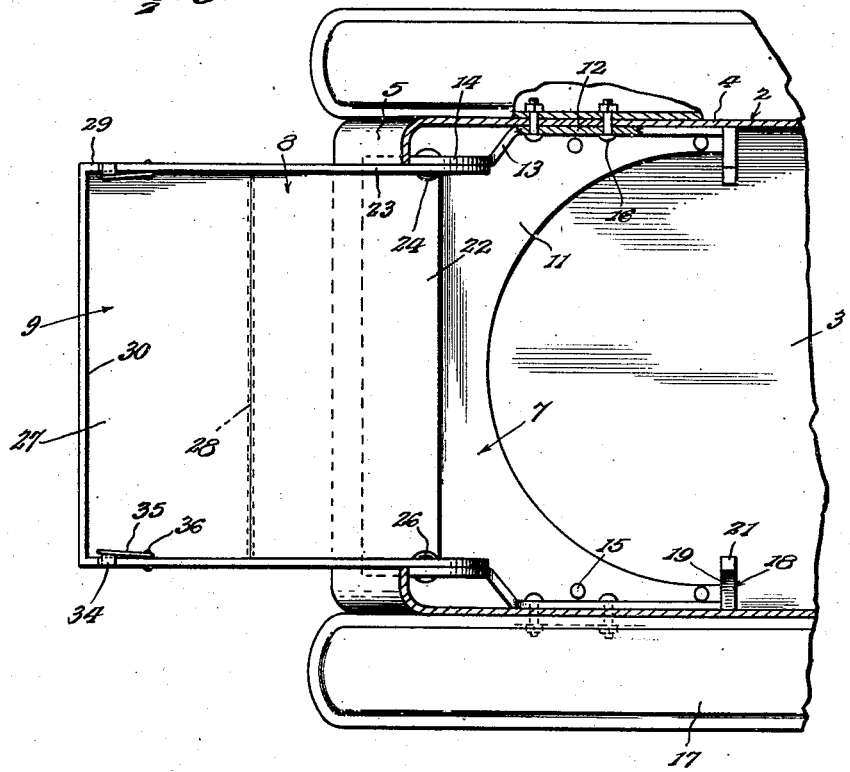
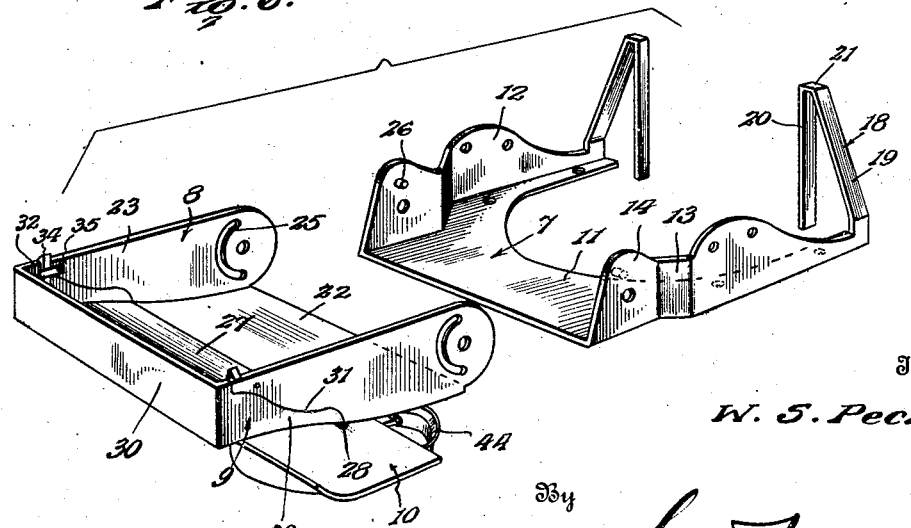
Inventor
W. S. Peck.
By Lacy & Lacy, Attorneys Patented Jan. 10, 1928.

1,655,797

UNITED STATES PATENT OFFICE.

WILLIAM S. PECK, OF HINTON, WEST VIRGINIA.

CONVERTIBLE AUTOMOBILE TONNEAU.

Application filed March 3, 1926. Serial No. 92,050.

This invention relates to improvements in convertible automobile tonneaus and has as its general object to provide a tonneau for runabouts which may be readily converted to adapt the tonneau for service in accommodating passengers or as a truck, the arrangement of the component parts of the structure being such that the convertible nature of the tonneau will not be conspicuous.

Another object of the invention is to so construct and relatively connect the component units of the convertible tonneau that the same will be substantially completely housed within the tonneau of the automobile, when the tonneau construction of the present invention is not in use, and in this connection the invention further contemplates the provision of means for supporting the spare tire carrier upon one of the sections of the convertible tonneau in such a manner that the sections may be relatively adjusted without any interference on the part of the said carrier.

Another object of the invention is to so construct the convertible tonneau that the seat unit thereof will be firmly supported when adjusted to position for use and the truck unit with which the seat unit is associated, together with a closure section, will be at such time so positioned as to conform to the initial contour of the tonneau, thus entirely obviating any suggestion of the conversion of the convertible tonneau into a truck body.

Another object of the invention is to so mount the spare tire carrier that when the tonneau is converted for use as a truck body, the said tire carrier and the tire carried thereby will be positioned wholly beneath the structure and, therefore, entirely out of the way so that it will not offer any obstruction to the loading and unloading of the truck body.

Another object of the invention is to provide means for so relatively connecting all of the units of the convertible tonneau that they may be relatively adjusted with great facility and without the removal or replacement of any fastening devices or other holding means.

In the accompanying drawings:

Figure 3 is a view similar to Figure 2, illustrating the component units of the convertible tonneau in the positions which they will assume when the tonneau is completely closed.

Figure 4 is a view similar to Figure 3, illustrating the positions assumed by the component units when the seat unit is to be employed.

Figure 5 is a horizontal sectional view taken substantially on the line 5—5 of Figure 2, looking in the direction indicated by the arrows.

Figure 6 is a group perspective view illustrating the units comprising the convertible tonneau embodying the invention.

Figure 1:
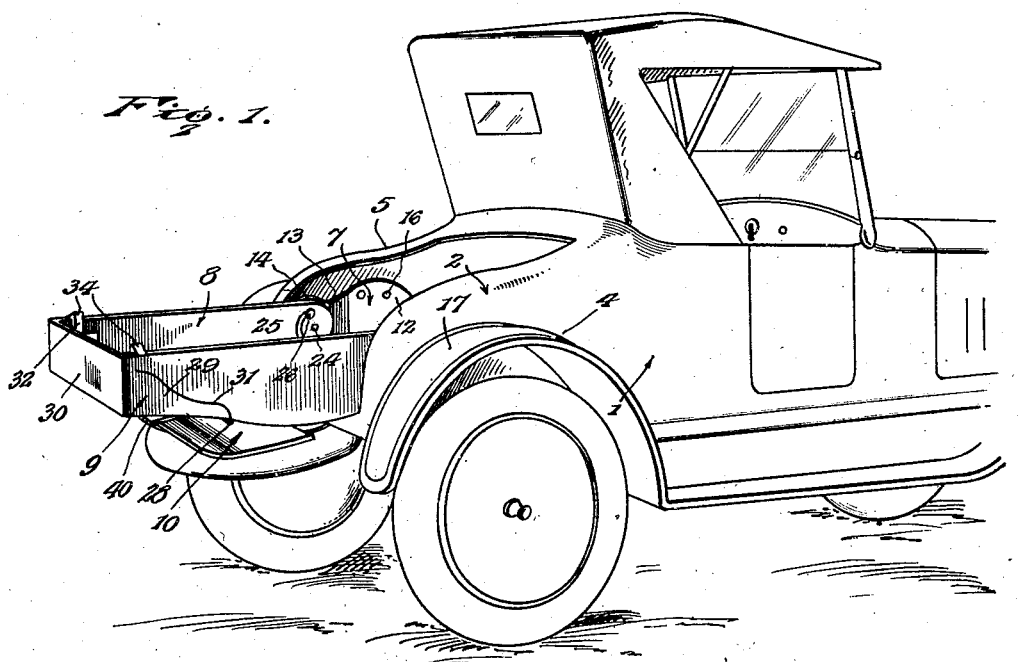
Figure 1 is a perspective view illustrating the convertible tonneau embodying the present invention installed upon an automobile and converted for use as a truck body.

In the drawings, the body of the automobile upon which the structure embodying the invention is installed, is indicated by the numeral 1 and the tonneau of the body by the numeral 2. In adapting the tonneau 2 for the installation of the convertible structure embodying the invention, the opening in the top of said tonneau 2 is enlarged by cutting away the rear portion of the top of the said tonneau 2 to substantially the floor line thereof, the floor of the tonneau 2 being indicated by the numeral 3, the side walls by the numeral 4, and the downwardly sloped and curved top by the numeral 5. The chassis frame of the automobile is indicated by the numeral 5' and includes a rear cross member indicated by the numeral 6.

The convertible tonneau construction embodying the invention includes a body unit 7, a truck unit 8, a seat unit 9, and a closure unit 10.

The several units are preferably formed of heavy sheet metal or, if desired, they may be cast, and the body section 7 comprises a bottom 11 and upstanding side members 12 which are offset intermediate their front and rear ends, as at 13, so as to provide portions 14 with which the truck unit 8 is connected in a manner to be presently explained, these portions being located in planes spaced inwardly with respect to the planes occupied by the forward portions of the said side members. Bolts 15 are secured through the bottom 11 of the said body unit and through the floor 3 of the tonneau 1, and other bolts 16 are secured through the forward portions of the side members 12 and through the side walls 4 of the tonneau beneath the fenders of the automobile, which fenders are indicated by the numeral 17. In order to support the truck unit when the same is in closed position as shown in Figures 3 and 4 of the drawings, upright supporting members indicated in general by the numeral 18 are provided at the front corners of the body unit and each comprises an upwardly and inwardly inclined extension 19 of the respective side member 12 and a downwardly extending leg 20 connected with the upper end or the said extension 19 by a flat connecting portion 21.

It will be observed by reference to Figures 1 and 5 of the drawings, that the offset rear portions 14 of the side members 12 are spaced inwardly from the side walls 4 of the tonneau of the automobile and are located relatively close to the rear open end of the tonneau.

The truck unit 8 comprises a bottom 22 which, throughout its length, is curved to conform substantially to the curvature of that portion of the top 5 of the tonneau 2 with which it is to match when the said unit is in the closed position shown in Figures 3 and 4 of the drawings. This unit further comprises side members 23 which occupy parallel planes and extend upwardly from the opposite lateral edges of the bottom 22, and the unit is disposed with the forward ends of its sides 23 seating against the inner sides of the offset portions 14 of the sides 12 of the body unit 7, and pivots 24 are fitted through these parts and serve to swingingly connect the unit 8 with the unit 7. The said forward end portions of the sides 23 of the unit 8 are formed each with an arcuate semi-circular slot 25, and studs 26 are fixed upon the inner sides of the offset portions 14 of the sides 12 of the unit 7 and project through the said slots, the slots being concentric to the respective pivots 24. It will now be evident that the unit 8 may be swung about the pivots 24 to occupy the closed position shown in Figures 3 and 4 of the drawings, in which position the free ends of its sides 23 will rest upon the portions 21 of the supporting members 18 and the bottom 22 of the said unit 8 will be flush and continuous with the top 5 of the tonneau 2 of the automobile, or the said unit may be swung to occupy the position shown in Figures 1, 2 and 5 of the drawings, in which position the studs 26 will engage in one end of the respective slot 25 and the under side of the bottom 22 will substantially meet the upper surface of the bottom 11 of the body section 7, and in this latter position of adjustment of the truck unit 8, it will serve its primary purpose, namely that of a truck body. It will be understood that when the said unit 8 is swung to the position shown in Figures 3 and 4 of the drawings, it will be inverted and constitute a closure for a portion of the opening of the tonneau 2 of the automobile.

Figure 2:
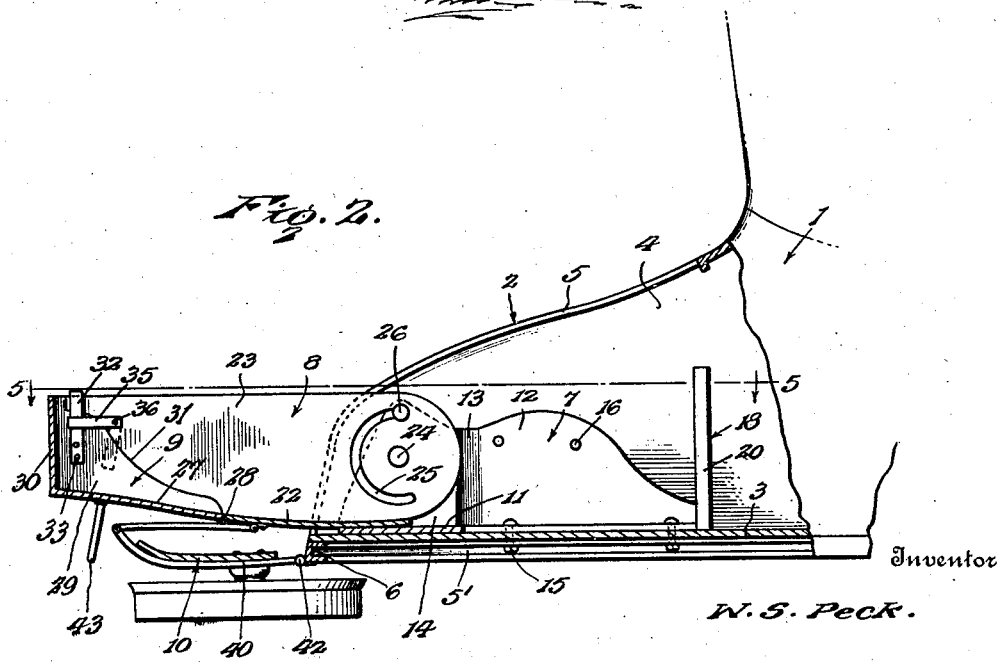
Figure 2 is a vertical front to rear sectional view through the structure arranged as shown in Figure 1 of the drawings.

The seat unit 9 comprises a bottom 27 which is hinged at its forward edge as at 28, to the free rear edge of the bottom 22 of the unit 8, and the said unit 9 further comprises side members 29 located at the lateral edges of the bottom 27 and extending upwardly therefrom, and a back rest 30 which extends between the rear ends of the side members 29. The side members 23 and 29 of the units 8 and 9 respectively, are formed with meeting edges 31 which may be of any desired curvilinear extent and which match when the said units 8 and 9 are in alinement, as for example, when the convertible tonneau is completely closed as shown in Figure 3 of the drawings and when it is employed as a truck body as shown in Figures 1, 2 and 5 of the drawings. The numeral 32 indicates latches which are secured at one end, as at 33, to the inner side of each of the side members 29 of the seat unit and which at their upper ends, are provided with laterally outwardly projecting latch heads 34 designed to engage over the upper edges of the truck unit 8 when the said truck and seat units are in the alined positions shown in Figures 1, 2 and 5 of the drawings, thus adapting the seat unit to constitute a continuation of the truck unit and securely supporting the seat unit 9 against downward swinging movement with relation to the truck unit 8. The latch members 32 are resilient and have a tendency to spring outwardly so that their heads will engage with the upper edges of the sides 23 of the said unit 8, but in order to insure against any inward displacement of the said latch members, detents 35 are pivoted as at 36, upon the inner sides of the side members 23 of the unit 8 and are adapted to be swung into and out of position to engage behind the said latch members as shown in full and dotted lines in Figure 2 of the drawings.

The numeral 37 indicates in general a link connection between the truck unit 8 and the cross member 6 of the chassis frame 5', and this connection comprises a link 38 hinged at one end as at 39, to the under side of the bottom 22 of the truck unit 8 near that edge thereof which is hingedly connected with the seat unit 9, and a link 40 which is hingedly connected at one end as at 41, with the other end of the said link 38 and at its other end is hingedly connected, as at 42, with the said cross member 6 of the chassis frame. The closure unit 10 comprises a plate which is riveted or otherwise secured as at 42' to the link 40, and which is of a curvature to conform to and constitute a continuation of the bottom 22 of the truck unit 8 when the units are closed as shown in Figure 3 and likewise when closed as shown in Figure 4, the link 40 being curved to correspond to the curvature of the closure unit 10 and the link 38 being curved to correspond to the curvature of the bottom of the said truck unit 8, so that in the said position of the units the two links will extend along the outer sides of the bottom 22 and the plate comprising the unit 10. Likewise, in this position of the parts, as will be observed by reference to Figures 3 and 4 of the drawings, the upper edge of the plate comprising the unit 10 will abut the lower or rear edge of the bottom member 22 of the truck unit 8 and the lower or rear edge of the said plate 10 will rest upon the floor 3 of the tonneau of the automobile at the rear edge thereof, thus closing the space which would otherwise be left between the said bottom 22 and the floor of the tonneau. It will likewise be observed by reference to Figure 3 of the drawings, that when the seat unit 9 is closed, together with the other units, its bottom will extend between the upper or forward edge of the bottom 2 of the truck unit and the forward wall of the opening in the top of the tonneau of the automobile. With the parts in the positions illustrated in Figure 3 of the drawings and assuming that it is desired to arrange the tonneau structure to accommodate passengers, the tonneau structure in its entirety is swung about the pivots 24 until the back rest 30 of the seat unit 9 has cleared the front wall of the opening in the top of the tonneau of the automobile, after which the latches 32 are disengaged from the edges of the side members of the unit 8 and the seat unit is swung rearwardly and upwardly about the hinge joint 28, the unit 8 being in the meantime permitted to lower to position with its side members 23 resting upon the supporting members 18, as shown in Figure 4 of the drawings. A preferably U-shaped rest 43 is secured to the bottom 27 of the seat unit and, in the position of adjustment of the said unit shown in Figure 4, rests upon the upper side of the bottom 22 of the truck unit, this rest also constituting a handle whereby the tonneau structure as a whole may be swung upwardly and rearwardly in the initial adjustment of the parts as above described.

In the event it is desired to convert the tonneau structure for use as a truck, the structure may be bodily swung upwardly from the position shown in Figure 3 of the drawings, until the units 8 and 9 are in front to rear alinement as shown in Figures 1 and 2, and as the parts are thus moved, the links 38 and 40 will move about their hinge joint 41 so that the link 40 will carry the closure unit 10 to position lying beneath the bottom 22 of the truck unit 8 and seat unit 9, as clearly shown in the said Figures 1 and 2. Of course, when the units 8 and 9 are swung bodily upwardly and forwardly, the closure unit 10 will be carried upwardly and restored to its original position as shown in Figure 3 by the link 40, as the first mentioned units assume their closed positions.

The numeral 44 indicates a tire carrier which is riveted or otherwise secured to the link 40 of the link connection 37 and so long as the truck unit is in closed position, as shown in Figures 3 and 4 of the drawings, and regardless of the position of the seat unit, the said tire carrier will assume a slightly inclined position at the rear of the tonneau as a whole and, therefore, substantially the position which it ordinarily occupies. However, when the tonneau assemblage is adjusted so as to convert the same for use as a truck, the tire carrier will be positioned beneath the units 8 and 9, as shown in Figures 1 and 2 of the drawings and will, therefore, be automaticallly brought to a position where it will not in any way interfere with loading or unloading of the truck body.

Having thus described the invention, what I claim is:

1. The combination with the tonneau of an automobile having a continuous opening in its top and rear, of a convertible structure comprising a body unit housed within the tonneau, a truck unit swingingly connected with the body unit and adjustable to assume a position closing a part of the top of the tonneau and to assume a position extending through the rear of the tonneau, a seat unit swingingly connected with the truck unit and adjustable to assume a position closing the top of the tonneau in advance of the truck unit, to assume a position above the said truck unit and constitute a seat, and to assume a position to constitute a rearward extension of the truck unit when the latter unit is in its last mentioned position of adjustment, means for normally holding the seat and truck units against relative movement, and means upon the seat unit constituting a handle whereby the units may be swung in unison about the connection between the truck unit and body unit and also constituting a rest for the seat unit when the latter is in its second mentioned position of adjustment.

2. The combination with the tonneau of an automobile having a continuous opening in its top and rear, of a convertible structure comprising a body unit housed within the tonneau, a truck unit swingingly connected with the body unit and adjustable to assume a position closing a part of the top of the tonneau and to assume a position extending through the rear of the tonneau, a seat unit swingingly connected with the truck unit and adjustable to assume a position closing the top of the tonneau in advance of the truck unit, to assume a position above the said truck unit and consitute a seat, and to assume a position to constitute a rearward extension of the truck unit when the latter unit is in its last mentioned position of adjustment, the said seat and truck units including side members, latches mounted upon the sides of the seat unit and engageable over the upper edges of the sides of the truck unit and constituting means for holding the seat and truck units against relative movement, and means upon the seat unit constituting a handle whereby the units may be swung in unison about the connection between the truck unit and body unit and also constituting a rest for the seat unit when the latches are disengaged and when the seat unit is in its second mentioned position of adjustment.

3. The combination with the tonneau of an automobile having a continuous opening in its top and rear, of a convertible structure comprising a body unit housed within the tonneau, a truck unit swingingly connected with the body unit and adjustable to assume a position closing a part of the top of the tonneau and to assume a position extending through the rear of the tonneau, a seat unit swingingly connected with the truck unit and adjustable to assume a position closing the top of the tonneau in advance of the truck unit, to assume a position above the said truck unit and constitute a seat, and to assume a position to constitute a rearward extension of the truck unit when the latter unit is in its last mentioned position of adjustment, a closure unit for closing the rear of the opening in rear of the truck unit when the truck unit is in its first mentioned position of adjustment, and means connected with the truck unit to support the closure unit and effect automatic movement thereof into and out of closing position upon adjustment of the said truck unit.

4. The combination with the tonneau of an automobile having a continuous opening in its top and rear, of a convertible structure comprising a body unit housed within the tonneau, a truck unit swingingly connected with the body unit and adjustable to assume a position closing a part of the top of the tonneau and to assume a position extending through the rear of the tonneau, a seat unit swingingly connected with the truck unit and adjustable to assume a position closing the top of the tonneau in advance of the truck unit, to assume a position above the said truck unit and constitute a seat, and to assume a position to constitute a rearward extension of the truck unit when the latter unit is in its last mentioned position of adjustment, a closure unit for closing the rear of the opening in rear of the truck unit when the truck unit is in its first mentioned position of adjustment, and means connected with the truck unit to support the closure unit and effect automatic movement thereof into and out of closing position upon adjustment of the said truck unit, the said means comprising a link swingingly connected with the truck unit, and a link constituting the support for the said closure unit and swingingly connected at one end with the bottom of the tonneau and at its other end with the first mentioned link.

5. The combination with the tonneau of an automobile having a continuous opening in its top and rear, of a convertible structure comprising a body unit housed within the tonneau, a truck unit swingingly connected with the body unit and adjustable to assume a position closing a part of the top of the tonneau and to assume a position extending through the rear of the tonneau, a seat unit swingingly connected with the truck unit and adjustable to assume a position closing the top of the tonneau in advance of the truck unit, to assume a position above the said truck unit and constitute a seat, and to assume a position to constitute a rearward extension of the truck unit when the latter unit is in its last mentioned position of adjustment, a closure unit for closing the rear of the opening in rear of the truck unit when the truck unit is in its first mentioned position of adjustment, means connected with the truck unit to support the closure unit and effect automatic movement thereof into and out of closing position upon adjustment of the said truck unit, the said means comprising a link swingingly connected with the truck unit, and a link constituting the support for the said closure unit and swingingly connected at one end with the bottom of the tonneau and at its other end with the first mentioned link, and a tire carrier mounted upon the last mentioned link.

6. The combination with the tonneau of an automobile having a continuous opening in its top and rear, of a convertible structure comprising a body unit housed within the tonneau, a truck unit swingingly connected with the body unit and adjustable to assume a position closing a part of the top of the tonneau and to assume a position extending through the rear of the tonneau, uprights within the tonneau for supporting the said unit in its first mentioned position of adjustment, a seat unit swingingly connected with the truck unit and adjustable to assume a position closing the top of the tonneau in advance of the truck unit, to assume a position above the said truck unit and constitute a seat, and to assume a position to constitute a rearward extension of the truck unit when the latter unit is in its last mentioned position of adjustment, and means for holding the seat and truck units against relative movement.

7. The combination with the tonneau of an automobile having side walls and a top and provided in its top with a continuous opening extending from the forward portion of the said top substantially to the floor of the tonneau at the rear, of a convertible structure comprising a body unit housed within the tonneau and including a bottom and upstanding side members, the forward portions of the said side members being secured to the side walls of the tonneau and the rear portions of the said side walls being inwardly offset to occupy substantially the planes of the side edges of the said opening, a truck unit swingingly connected with the body unit and comprising a bottom and sides and adjustable to assume a position with its bottom closing a part of the opening in the top of the tonneau and to assume a position extending through the rear of the said opening, a seat unit swingingly connected with the truck unit and adjustable to assume a position closing the forward portion of the opening in the top of the tonneau, to assume a position above the truck unit and constitute a seat, and to assume a position to constitute a rearward extension of the truck unit when the latter is in its last mentioned position of adjustment, the said sides of the truck and seat units occupying a common plane substantially coincident with the planes of the corresponding edges of the opening in the tonneau and of longitudinal contour to substantially correspond to the longitudinal contour of the top and rear of the tonneau when the units are in position closing the opening in the tonneau, a closure unit constituting a continuation of the truck unit when the latter is adjusted to position to constitute a closure for the said opening and to close the rear of the said opening in rear of the truck unit, and means connected with the truck unit to support the closure unit and effect automatic movement thereof into and out of closing position upon adjustment of the said truck unit.

8. The combination with the tonneau of an automobile having a continuous opening in its top and rear, of a convertible structure comprising a body unit housed within the tonneau, a truck unit swingingly connected with the body unit and adjustable to assume a position closing a part of the top of the tonneau and to assume a position extending through the rear of the tonneau, a seat unit swingingly connected with the truck unit and adjustable to assume a position closing the top of the tonneau in advance of the truck unit, to assume a position above the said truck unit and constitute a seat, and to assume a position to constitute a rearward extension of the truck unit when the latter unit is in its last mentioned position of adjustment, and a closure unit for closing the rear of the opening in rear of the truck unit when the truck unit is in its first mentioned position of adjustment.

In testimony whereof I affix my signature.

WILLIAM S. PECK. [L. S.]